Feb. 14, 1933.                K. R. LEWIS                1,897,171
                   LOAD LIFTING AND WEIGHING DEVICE
                      Filed May 2, 1932        2 Sheets-Sheet 1

INVENTOR.
Kenneth R. Lewis
BY
Lancaster, Allwine and Rommel
ATTORNEYS.

Feb. 14, 1933.  K. R. LEWIS  1,897,171
LOAD LIFTING AND WEIGHING DEVICE
Filed May 2, 1932  2 Sheets-Sheet 2
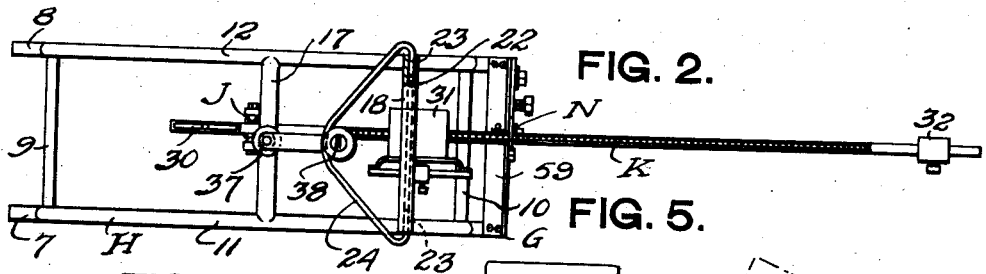
FIG. 2.
FIG. 5.
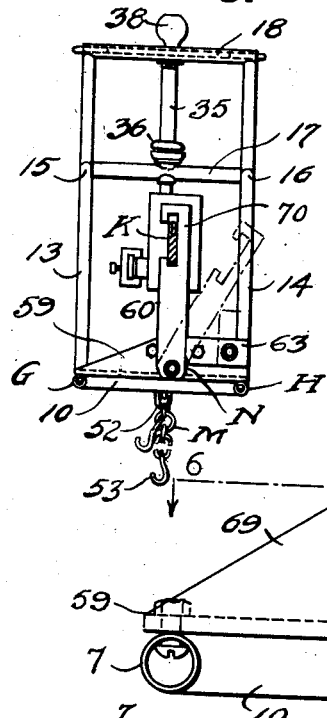
FIG. 3.
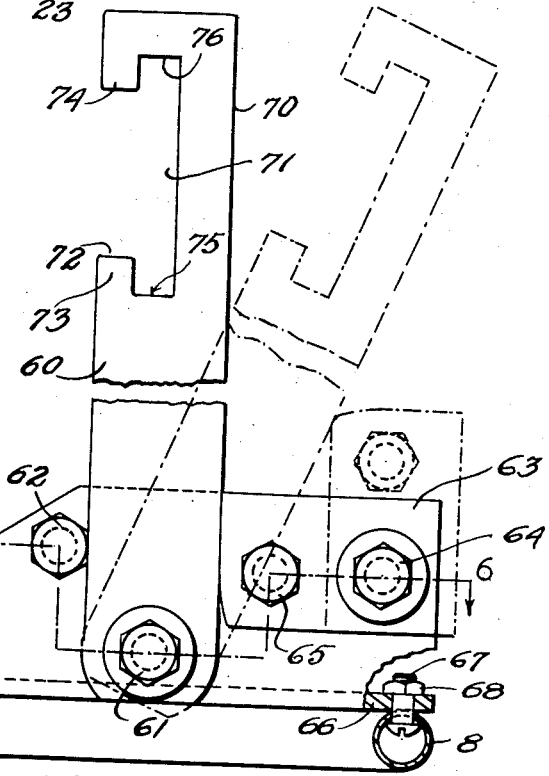
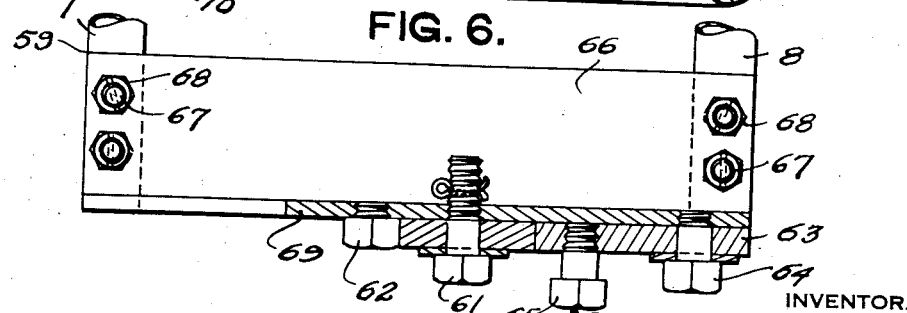
FIG. 6.
INVENTOR.
Kenneth R. Lewis
BY
Lancaster, Allwine and Rommel
ATTORNEYS.

Patented Feb. 14, 1933

1,897,171

UNITED STATES PATENT OFFICE

KENNETH R. LEWIS, OF ORCHARD LAKE, MICHIGAN, ASSIGNOR TO PHILLIPS PETROLEUM COMPANY, OF BARTLESVILLE, OKLAHOMA, A CORPORATION

LOAD LIFTING AND WEIGHING DEVICE

Application filed May 2, 1932. Serial No. 608,800.

The present invention relates to load lifting and weighing devices, well adapted for use in the servicing of customers of liquefied gas, where cylinders containing the liquids to be weighed are in housings upon which the devices may be positioned, so as to act as bases or supports for the devices during the lifting and weighing operations.

The principal objects of the invention are, to provide devices for the purpose set forth which are light in weight, and may thus be carried from place to place without fatigue; easily and speedily operated, especially as to the lifting and lowering of the loads and to make sure that the loads swing free of the bases and inner walls of the housings when in suspended weighing positions; and, of such character that wear at the fulcrum of the scales is reduced to a minimum, so that the equipment remains in good, accurate condition for a considerable length of time.

Another object of the invention is to provide a device of the character described which may be used within wide limits to lift the loads, without being cumbersome. Thus the equipment may be used with customers' installations of different sizes and designs, as, by way of example, where the top of the tank is closely adjacent the mouth of its housing, or where it is remote from such mouth.

Other objects and advantages of the invention will appear in the following detailed description, taken in connection with the accompanying drawings, forming a part of this specification, and in which drawings:—

Figure 2 is a plan view of the device.

Figure 3 is an end view, the scale beam being shown in section.

Figure 4 is a detail view mostly in vertical section of a portion of the lifting mechanism.

Figure 5 is a detail view in elevation of a trig loop.

Figure 6 is a sectional view on the line 6—6 of Figure 5.

Figure 1:
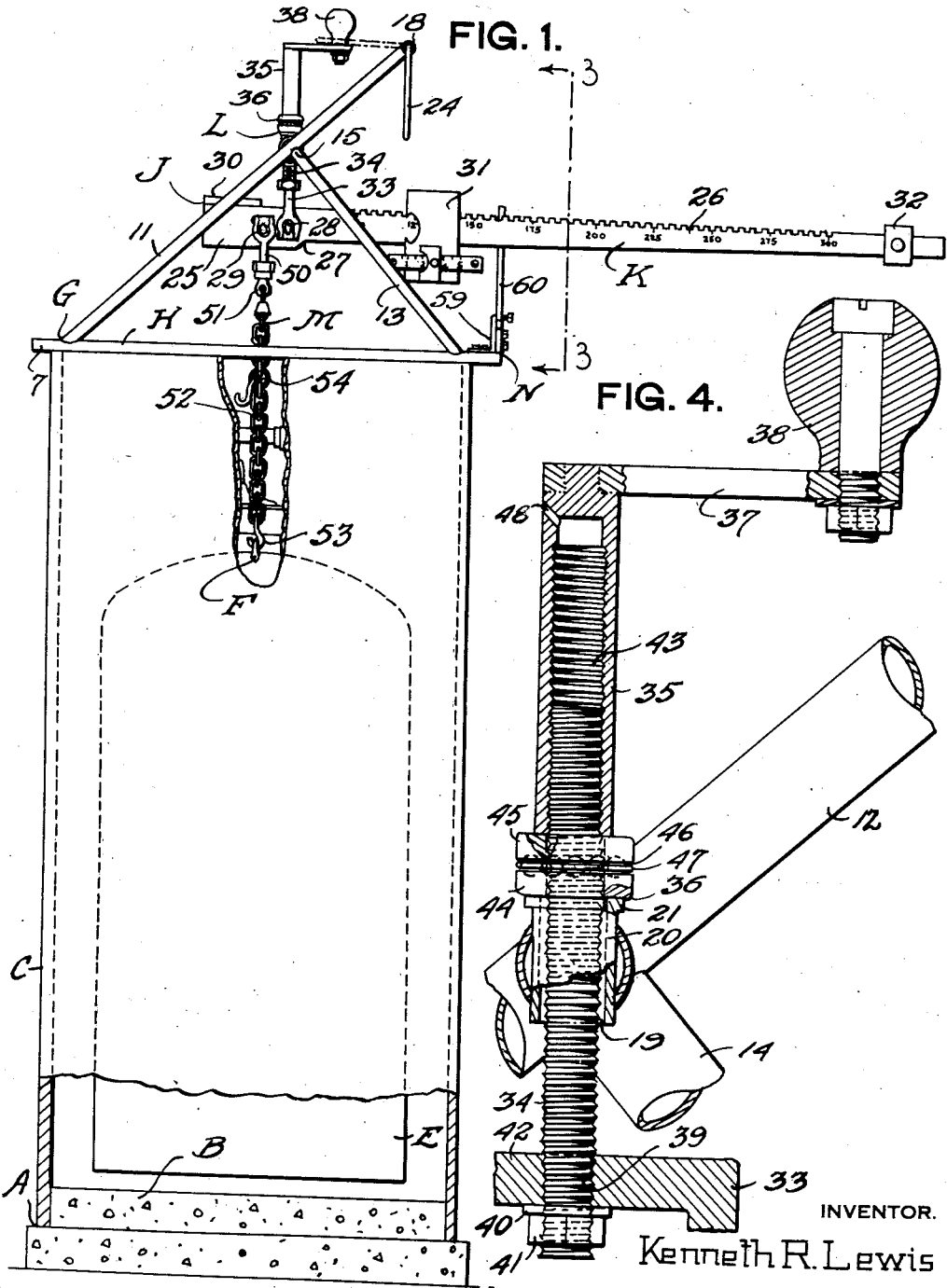
Figure 1 is a view partly in elevation and partly in vertical section showing the load lifting and weighing device in use, with the load suspended from the weighing portion.

In the drawings, where like characters designate like parts thruout the views, A is a housing including a base B and a cylindrical wall C; E a load, such as a cylinder for liquefied natural gas, provided with a device F to faciltate lifting of the load; and, G a lifting and weighing device constructed according to the present invention and comprising, a supporting frame H, a scale J including a beam K, an adjustable suspension device L for beam K, a coupling device M between the beam K and load E, and a device N to selectively restrict movement of the beam to narrow limits during the raising and lowering of the scale and load.

In the example shown, the load E normally rests upon the base B of housing A, in a protected position, a suitable cover, not shown in the drawings, being disposed over the mouth at the upper part of the housing. The load may comprise a liquid gas tank or container of the character disclosed in the application of Rosswell W. Thomas, Serial Number 398,239, filed October 8, 1929, wherein are shown suitable appliances for the ingress and egress of the liquefied gas, it being understood that the customer is supplied with a filled tank, together with suitable accessories, in the housing for a regulated supply of gas used for domestic and commercial purposes. The supply of liquefied gas is replenished periodically by service men who weigh the equipment together with its contents to determine the quantity which has been used by the customer and for billing purposes. Thus the tank is not removed when empty, or nearly empty, and a filled tank substituted, but the tank remains in the housing during the entire period of the contract with the customer. The service men periodically call on customers to determine the quantity of liquefied gas which has been consumed, and this is accomplished by weighing and also, as the supply of liquefied gas is replenished to the tank, the weighing mechanism is used to determine when a sufficient quantity of liquefied gas has been introduced into the tank. It is thus to be observed that the load lifting and weighing device is carried from the service truck to the customer's equipment and back to the truck for each servicing procedure, and it is for this reason that it is desirable to have a device comparatively light in weight, easily operated and of a character that will remain accurate for a great length of time.

The frame H is substantially like that shown in the application of Hurlbert R. Bridgewater, relating to weighing mechanism, filed February 14, 1930, Serial Number 428,479, but it is to be understood that the present invention is not restricted to a supporting frame of this character. In the example shown it comprises a plurality of tubular members as follows,—parallel base bar portions 7 and 8 adapted to rest upon the housing A; parallel spaced apart cross bars 9 and 10 adjacent opposite ends of bars 7 and 8 and connecting same; a pair of inclined, parallel bars 11 and 12, welded at their lower ends in acute angled relation with the bars 7 and 8 adjacent the cross bar 9; a pair of inclined parallel bars 13 and 14, welded at their lower ends in acute angled relation to the bars 7 and 8, adjacent the cross bar 10 and extending upwardly therefrom and joined to the bars 11 and 12 intermediate their ends, at points 15 and 16 so that the bars 11 and 13, and 12 and 14 are in converging relation; a cross beam 17 welded or otherwise secured to the bars 11 and 12, and 13 and 14, adjacent the junctures of the former with the latter; and a handle 18 welded, or otherwise secured to the upper terminals of the bars 11 and 12. The cross beam 17 is provided with a vertical opening 19, midway of its ends, and in this opening is preferably a pilot bushing 20 extending thru the beam transversely thereof, the bushing being provided with a flange 21 for a purpose to be subsequently set forth. The handle 18 is preferably of tubular stock and so welded in place that the ends of its bore or way 22 are open to receive the inturned portions 23 of a wire loop 24 or spring for cooperation with the adjustable suspension device L, as hereinafter set forth.

With reference to the scale J, in the example shown, it is very much similar to that shown in the application of Rosswell W. Thomas, relating to balance beam scales, filed February 14, 1930, Serial Number 482,505, in that the beam K has a short deep portion 25, and a longer graduated portion 26 which is of less depth than the portion 25, and is offset in reduced relation as at 27, with knife edge pivot trunnions 28 and 29, carried by the short deep portion 25 in the usual manner. There is also provided on beam K, a spirit bubble level 30, preferably surmounted upon the beam portion 25; a main poise 31, slidable along the graduated portion 26; and a counter-weight 32 adjustably positioned on the end of the beam K remote from the short, deep portion 25.

The adjustable suspension device L preferably comprises a yoke 33 engaging the trunnions 28 of beam K, a screw threaded stem 34 secured to and upstanding from yoke 33; a nut 35, preferably in the form of an internally screw threaded sleeve receiving stem 34; an anti-friction device 36 supporting the nut 35 upon the frame beam 17; and a crank 37 secured to nut 35 and including an upstanding crank handle 38. The screw threaded stem 34 may have engagement in a screw threaded opening 39 in yoke 33, a lock washer 40 and nut 41 holding the stem 34 secured to the bight portion 42 of the yoke. The stem 34 extends upwardly thru vertical opening 19 in beam 17 and is in screw threaded engagement with the threads 43 of the nut or sleeve 35. The anti-friction device may comprise companion ball races 44 and 45, the former preferably resting upon the flange 21 of bushing 20 and the latter engaging the lower portion of the nut 41, and suitable ball bearings 46 positioned between the races 44 and 45, there being shown a suitable retaining ring 47 for the balls. If desired, the nut 35 may have at its upper portion an oil way 48 thru which oil may be introduced for lubrication of the threaded portions of the stem 34 and nut 35. Crank 37 may be welded or otherwise secured to the upper portion of the nut. Thus, by rotation of the crank 37, the stem 34 may be drawn into or forced outwardly with respect to the nut, thus raising or lowering the scale J.

The coupling device M between the beam K and load E may comprise a yoke 50 engaging the trunnions 29 of the scale beam, the depending portion of the yoke, provided with a swivel 51; a chain or other flexible member 52 connected to the swivel 51; a hook 53 on the lower end of the chain for engagement with the device F to faciliate lifting of the load, the device F being in the form of an eye, welded or otherwise secured to the upper portion of the tank; and a hook 54 on the chain 52 intermediate the swivel 51, and hook 53, the hook 54 to be used for connection with a device like that shown at F on a tank, as where the housing C contains a tank like that shown at E, but having its top nearer the mouth of housing C.

In order to selectively restrict movement of the beam K to narrow limits during the raising and lowering of the scale and load, and while the device is being moved from place to place, the trig loop or device N is provided. In the example shown, it comprises a cross bar 59; an arm 60 pivotally mounted thereon as at 61; a stop 62 on bar 59 for limiting swinging movement of the arm 60 in one direction; and a latch 63 pivoted on bar 59 as at 64 and provided with a handle 65, the latch retaining the arm 60 against stop 62 when the device is in use to restrict swinging movement of the scale beam K. The cross bar may be in the form of an angle bar, with a horizontal flange 66 secured to the horizontal bars 7 and 8 as by bolts 67 receiving nuts 68, and an upstanding flange 69 to which the pivots 61 and 64 are secured, as well as stop 62. Arm 60 is provided with a C-shaped terminal portion 70 for embracing relation with the scale beam K, as shown in Figure 3. The terminal portion 70 provides a recess 71, the entrance 72 of which is defined by confronting lugs or projections 73 and 74, the entrance 72 being sufficiently wide to permit swinging movement of the arm 60 to a vertical position, at which time the scale beam will be in the recess 71 and either engage the lower surface 75 of the recess, as when the poise 31 is remote from trunnions 28, or the upper surface 76 of the recess, when the load E is being supported by the scale thru the coupling device M.

In practice, when not in use, and while being carried from the servicing truck to the customer's equipment, and back to the truck, the loop 24 is disposed about the handle 38 of crank 37 to prevent rotation of the nut 35. The trig loop or device N is also arranged to restrict movement of the beam K to narrow limits. When the device is disposed upon the housing A for the purpose of lifting and weighing the load, the hook 53 is engaged with device F, the loop 24 swung to the full line position in Figure 1 and crank 37 rotated until the load E has been lifted from base B. During this operation, it is to be observed that no great amount of swinging movement will occur at trunnions 28 and 29 since the scale beam K is restricted in its movement by the trig loop. After the service man has made sure that the load E is free of the base B and the wall C of the housing, latch 63 may be released and the trig loop swung to the dotted position shown in Figures 3 and 5, whereupon the scale J may be used in the regular manner.

It is to be noted that the lifting and weighing device may be used within wide limits to lift the load, since the stem 34 is relatively long. The device may be used with different sizes and designs of customers' equipment, the hooks 53 and 54, either of which may be selected to engage the load according to the size or model of tank E in the housing C making it unnecessary to impart considerable movement to the crank 37 in order to draw the chain 52 taut and lift the load.

When the weighing operation has been completed, the load E may be quickly lowered by rotating the crank in the proper direction to feed the stem 34 downwardly, the weight of the tank and its contents facilitating the lowering operation.

Changes in details may be made without departing from the spirit or scope of this invention as defined by the following claims.

I claim:
1. A load lifting and weighing device comprising, a supporting frame including a carrying handle, a scale including means to suspend the load therefrom, and means suspending the scale from the frame including a screw threaded stem operatively connected to and upstanding from said scale adjacent said handle, a nut rotatably supported on the frame and in screw threaded enclosing relation with the upper end portion of said stem, and a crank handle on said nut.

2. A load lifting and weighing device comprising, a supporting frame including a cross beam and a carrying handle located at one side and above said beam, a scale including means to suspend the load therefrom, means adjustably suspending said scale from the said frame beam including an operating crank, and a device carried by the frame handle and movable to a position to engage and restrain rotation of the crank.

3. A load supporting and weighing device comprising, a supporting frame including a cross beam and a carrying handle located to one side of and above said beam, a scale including means to suspend the load therefrom, means adjustably suspending said scale from the said frame beam including an operating crank with an upstanding handle, and a loop carried by the frame handle and movable to a position to engage about the crank handle and restrain rotation of the crank.

4. A load lifting and weighing device comprising, a supporting frame, a scale including a balance beam, means pivotally connected with the beam and pendantly supporting the scale from the frame and for bodily raising and lowering the scale with respect to the frame, an arm pivotally carried by the frame provided with a C-shaped terminal portion, remote from the pivot of the arm for embracing the scale beam remote from its connection with said first mentioned means to restrict movement of the beam to narrow limits during the raising and lowering of the scale, said arm being movable to a non-embracing position to permit movement of the beam thru wide limits, and a device for coupling the scale to the load.

5. A load lifting and weighing device comprising, a supporting frame, a scale including a balance beam, means pivotally connected with the beam and pendantly supporting the scale from the frame and for bodily raising and lowering the scale with respect to the frame, an arm pivotally carried by the frame provided with a C-shaped terminal portion, remote from the pivot of the arm for embracing the scale beam remote from its connection with said first mentioned means to restrict movement of the beam thru narrow limits during the raising and lowering of the scale, said arm being movable to a non-embracing position to permit movement of the beam thru wide limits, a latch carried by the frame to retain the arm in a scale beam embracing position, and a device for coupling the scale to the load.

6. In weighing mechanism of the class described, the combination with a customer's tank, and a housing for receiving the customer's tank in a vertically movable relation therein, of a portable frame removably disposed upon said housing, a scale, means adjustably suspending said scale from the frame above the housing, and a coupling device for suspending the customer's tank from the scale, including a plurality of independent hooks located at different distances vertically below the scale and in the housing below the base of said supporting frame.

KENNETH R. LEWIS.